(12) United States Patent
Hunt et al.

(10) Patent No.: US 12,085,720 B2
(45) Date of Patent: *Sep. 10, 2024

| | | |
|---|---|---|
| (54) | CONTACT LENS SYSTEM | |
| (71) | Applicant: | Telefonaktiebolaget LM Ericsson (publ), Stockholm (SE) |
| (72) | Inventors: | Alexander Hunt, Tygelsjö (SE); Hector Caltenco, Oxie (SE) |
| (73) | Assignee: | TELEFONAKTIEBOLAGET LM ERICSSON (PUBL), Stockholm (SE) |
| ( * ) | Notice: | Subject to any disclaimer, the term of this patent is extended or adjusted under 35 U.S.C. 154(b) by 0 days. |
| | | This patent is subject to a terminal disclaimer. |
| (21) | Appl. No.: | 18/217,263 |
| (22) | Filed: | Jun. 30, 2023 |

(65) Prior Publication Data

US 2024/0004201 A1    Jan. 4, 2024

Related U.S. Application Data

(63) Continuation of application No. 17/893,263, filed on Aug. 23, 2022, now Pat. No. 11,726,334, which is a
(Continued)

(51) Int. Cl.
*G02B 27/01* (2006.01)
*G02C 7/04* (2006.01)
(Continued)

(52) U.S. Cl.
CPC ..... *G02B 27/0172* (2013.01); *G02B 27/0179* (2013.01); *G02C 7/04* (2013.01);
(Continued)

(58) Field of Classification Search
CPC .......... G02B 27/0172; G02B 27/0179; G02B 2027/0187; G02C 7/04; G06F 3/013;
(Continued)

(56) References Cited

U.S. PATENT DOCUMENTS

| 7,588,332 B2 | 9/2009 | Blum et al. |
|---|---|---|
| 9,468,372 B2 | 10/2016 | Pugh et al. |
| | (Continued) | |

FOREIGN PATENT DOCUMENTS

| JP | 2013532010 A | 8/2013 |
|---|---|---|
| JP | 2013534847 A1 | 9/2013 |
| | (Continued) | |

OTHER PUBLICATIONS

International Search Report and the Written Opinion of the International Searching Authority, issued in corresponding International Application No. PCT/EP2019/057621, dated Dec. 2, 2019, 11 pages.
(Continued)

*Primary Examiner* — Dmitriy Bolotin (74) *Attorney, Agent, or Firm* — Rothwell, Figg, Ernst & Manbeck, P.C.

(57) ABSTRACT

A contact lens system (110) for placing in an eye for augmented reality systems is disclosed. The contact lens system (110) comprises a display (111) comprising a matrix of display elements; a driver unit (112) configured to receive data from a host (120) and to present the data on the display (111) and a set of sensors (113) integrated on the display (111) for measuring pupil size. The driver unit (112) is further configured to read outputs from the set of sensors to determine the pupil size and adjust a size of an active area of the display.

20 Claims, 7 Drawing Sheets

Related U.S. Application Data continuation of application No. 17/598,073, filed as application No. PCT/EP2019/057621 on Mar. 26, 2019, now Pat. No. 11,467,412.

(51) Int. Cl.
  *G06F 3/01* (2006.01)
  *G09G 3/20* (2006.01)

(52) U.S. Cl.
  CPC ............... *G06F 3/013* (2013.01); *G09G 3/20* (2013.01); *G02B 2027/0187* (2013.01); *G09G 2320/0626* (2013.01); *G09G 2320/08* (2013.01); *G09G 2340/04* (2013.01); *G09G 2354/00* (2013.01); *G09G 2360/141* (2013.01); *G09G 2360/18* (2013.01)

(58) Field of Classification Search
  CPC .............. G09G 3/20; G09G 2320/0626; G09G 2320/08; G09G 2340/04; G09G 2354/00; G09G 2360/141; G09G 2360/18
  See application file for complete search history.

(56) References Cited

U.S. PATENT DOCUMENTS

| | | | |
|---|---|---|---|
| 10,698,217 B2 | 6/2020 | Fattal | |
| 11,467,412 B2* | 10/2022 | Hunt | .................. G02B 27/0172 |
| 11,726,334 B2* | 8/2023 | Hunt | ..................... G06F 3/013 |
| | | | 345/156 |
| 2005/0036109 A1 | 2/2005 | Blum et al. | |
| 2009/0015785 A1 | 1/2009 | Blum et al. | |
| 2009/0033863 A1 | 2/2009 | Blum et al. | |
| 2009/0189830 A1 | 7/2009 | Deering et al. | |
| 2013/0336629 A1 | 12/2013 | Mulholland et al. | |
| 2014/0240665 A1 | 8/2014 | Pugh et al. | |
| 2015/0312560 A1 | 10/2015 | Deering et al. | |
| 2016/0116979 A1 | 4/2016 | Border | |
| 2016/0284129 A1 | 9/2016 | Nishizawa et al. | |
| 2016/0299354 A1 | 10/2016 | Shtukater | |
| 2017/0285370 A1* | 10/2017 | Leip | ....................... G02C 7/102 |
| 2022/0139525 A1* | 5/2022 | Chancellor | ............ G16H 10/60 |
| | | | 340/531 |

FOREIGN PATENT DOCUMENTS

| | | |
|---|---|---|
| JP | 2014170208 A | 9/2014 |
| KR | 10-2018-0053894 A | 5/2018 |
| WO | 201113080 A1 | 12/2011 |
| WO | 2011153158 A1 | 12/2011 |
| WO | 2012122411 A1 | 9/2012 |

OTHER PUBLICATIONS

Chiang et al. "Silicon nanocrystal-based photosensor on low-temperature polycrystalline-silicon panels" Appl. Phys. Lett. 91, 051120 (2007); doi: 10.1063/1.2767241.

Marcos et al. "The depth-of-field of the human eye from objective and subjective measurements" Vision Research 39 (1999) 2039-2049.

Parviz "Augmented Reality in a Contact Lens" Sep. 1, 2009, 4 pages.

* cited by examiner

CONTACT LENS SYSTEM

CROSS REFERENCE TO RELATED APPLICATION(S)

This application is a continuation of U.S. application Ser. No. 17/893,263, filed Aug. 23, 2022, which is a continuation of U.S. application Ser. No. 17/598,073, filed Sep. 24, 2021 (now U.S. Pat. No. 11,467,412), which is a 35 U.S.C. § 371 National Phase Entry Application from PCT/EP2019/057621, filed Mar. 26, 2019, designating the United States. The disclosures of the referenced applications are incorporated herein in their entirety by reference.

TECHNICAL FIELD

Embodiments herein relate to a contact lens system and method therein. In particular, they relate to a contact lens system with dynamic active area display for augmented reality systems.

BACKGROUND

Displays in augmented reality systems are evolving fast. Research has been done in the fields of adding electronics on a contact lens. Lens electronics have been used for multiple applications, such as dynamic vision correction or displaying images. In R. Blum et.al, "Enhanced electro-active lens system," 2007, electro-active vision correction has been proposed as means of adjusting lens correction depending on different conditions, such as distance from objects being viewed, ambient light or size of the pupil. In B. A. PARVIZ, "Augmented Reality in a Contact Lens," IEEE, 2010, researchers at University of Washington made a contact lens with 64 pixels that was tested on rabbits.

The pupil dilates, i.e., have different sizes, at different illumination, state of mind, distance to the object in focus, etc. Pupil size does not directly affect the field of vision, but it does affect the perceived depth-of-field, such that objects will appear blurrier in the edges of the vision with smaller pupil size, as described in S. Marcos, el.al., "The depth-of-field of the human eye from objective and subjective measurements," *Vision Res.*, 1999.

Things are different for objects displayed very close to the eyes, e.g., in a contact lens display. If the pupil size is smaller than the display size, then light from the edges of the display will not be perceived. That means that a display on a contact lens may be too small for the pupil at one scenario and too large in another.

US2014/0240665A1 discloses an eye-facing pupil diameter sensing system for an ophthalmic lens comprising an electronic system. The eye-facing pupil diameter sensing system is utilized to determine pupil diameter and use this information to control various aspects of the ophthalmic lens. The pupil diameter sensor is implemented as an array of smaller sensors placed at various locations in the contact lens to sample various points on the iris. Sensors may determine pupil diameter and changes thereof by detecting light reflection, impedance, electromagnetic field, neural activity, muscle activity, and other parameters as are known in the ophthalmic art. The possibility of incorporating an image display into the lens is briefly mentioned.

SUMMARY

It is therefore an object of embodiments herein to provide an improved contact lens system and method to counter act the problem described above.

According to one aspect of embodiments herein, the object is achieved by a contact lens system for placing in an eye. The contact lens system comprises a display comprising a matrix of display elements; a driver unit configured to receive data from a remote host and to present the data on the display; and a set of sensors integrated on the display for measuring pupil size. The driver unit is further configured to read outputs from the set of sensors to determine the pupil size and adjust a size of an active area of the display based on the pupil size by activating and deactivating the display elements.

According to one aspect of embodiments herein, the object is achieved by a method performed in a contact lens system for placing in an eye. The contact lens system comprises a display comprising a matrix of display elements; a driver unit configured to receive data from a remote host and to present the data on the display; and a set of sensors integrated on the display for measuring pupil size. The driver unit reads outputs from the set of sensors to determine the pupil size and adjust a size of an active area of the display based on the pupil size by activating and deactivating the display elements.

In other words, the contact lens system and method therein according to embodiments herein enables the size of the display being dynamically adjusted according to the pupil size. By measuring the pupil size, the display may dynamically change in size so that maximum amount of pixels that can be perceived by the user, can be used to display content.

Some advantages the contact lens system according to embodiments herein are that the user will always be able to see the maximum size of the display and that the data to be presented on the display may be dynamically adjusted based on the size of active area of the display.

Therefore, the embodiments herein provide an improved contact lens system and method for augmented reality systems.

BRIEF DESCRIPTION OF THE DRAWINGS

Examples of embodiments herein are described in more detail with reference to attached drawings in which.

DETAILED DESCRIPTION

Figure 1:
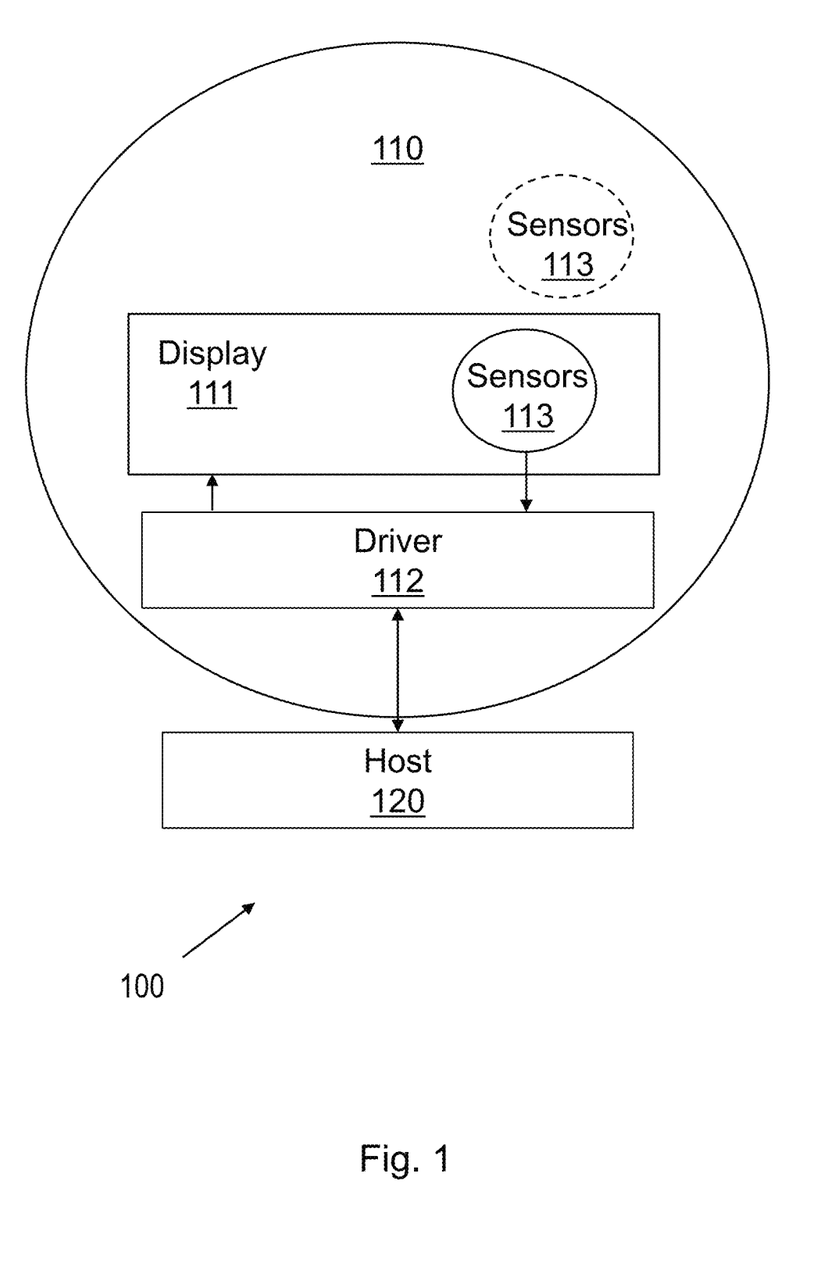
FIG. 1 is a schematic block diagram illustrating an augmented reality system in which a contact lens system according to embodiments herein may be implemented.

FIG. 1 depicts a block diagram of an augmented reality system 100 in which a contact lens system 110 according to embodiments herein may be implemented. The augmented reality system 100 comprises a contact lens system 110 for placing in an eye and a host 120 that sends information and interacts with the contact lens system 110. The contact lens system 110 comprises a display 111 comprising a matrix of display elements, a driver unit 112 configured to receive data from the remote host 120 and to present the data on the display 111, a set of sensors 113 for measuring the pupil size. The set of sensors 113 may be integrated on the display 111. The driver unit 112 controls what is outputted on the display 111 and handles the input from the set of sensors 113. The Host 120 interacts with the contact lens system 110 via the driver unit 112. The display 111 with the matrix of display elements is positioned on the contact lens and is able to emit light in a structured way.

The contact lens system may comprise a pair of contact lenses, one lens for each eye of the user. The lenses may be identical and display the same or different data.

The set of sensors 113 may be photodiodes that measures the light reflected from the eye. Other types of pupil size or diameter sensors may also be used. For example, as disclosed in US2014/0240665A1, the set of sensors may be a single- or multi-turn coil antenna. Such an antenna may receive electromagnetic radiation from the eye as the muscles controlling the iris contract and relax. It is well-known in the relevant art that muscle and neural activity of the eye may be detected through changes in electromagnetic emissions, for example with contact electrodes, capacitive sensors, and antennas. In this manner, a pupil diameter sensor based on a muscle sensor may be implemented. The pupil diameter sensor may also be implemented as one or more contact- or capacitive electrodes designed to measure impedance across the eye. Impedance may be used to detect changes in pupil diameter. For example, the impedance measured across the iris and pupil may change appreciably depending on pupil diameter. A pupil diameter sensor placed at the appropriate location on the eye and properly coupled to the eye could detect these changes in impedance and hence the pupil diameter or size. However, not all of these sensors can be incorporated into the display. Some of these may be placed outside the display, as shown in FIG. 1 sensors 113 with dotted line.

The display 111 may have at least two display sizes defined by a matrix with different numbers of rows and columns of the display elements. Each display size is herein referred to as a valid active area setting of the display. So an active area of the display may be adjusted to have different sizes, where the numbers of rows and columns of the display elements which are active for different display sizes are different. The display elements may herein also be referred to as pixels. The amount of available display sizes varies from minimum of two, i.e. minimum and maximum, and up to the number of pixels on the diagonal of the display divided by two, if all pixel row-column interceptions have a sensor. But there is no reason of having a smaller active area than the smallest pupil dimension. Normally the pupil ranges from 2 mm-8 mm in diameter. The display 111 and its active areas may be in different shapes, where a rectangular shape and a round shape are most common for a contact lens.

Figure 2:
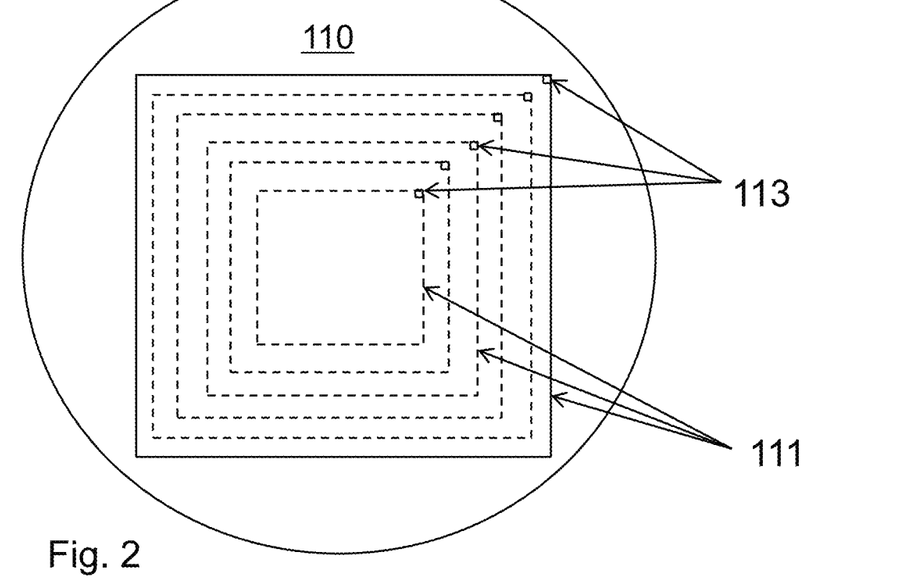
FIG. 2 is a schematic showing a contact lens system with different display sizes and photo sensors according to one embodiment herein.

FIG. 2 shows one example of a contact lens 110 with different display sizes in rectangular shapes and a set of sensors 113. As shown in FIG. 2, the set of sensors may be positioned diagonally in a corner within the display 111 at an edge of each display size. The set of photo sensors may be any format that is supported by the display 111.

Figure 3:
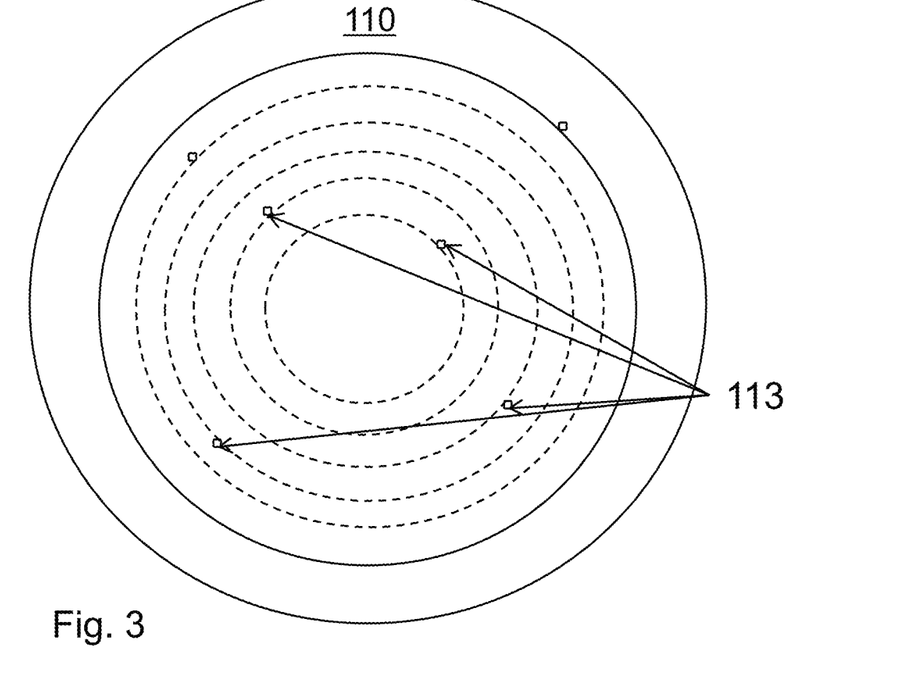
FIG. 3 is a schematic showing a contact lens system with different display sizes and photo sensors according to another embodiment herein.

FIG. 3 shows another example of a contact lens 110 with different display sizes in a concentric pixel arrangement and a set of sensors 113. As shown in FIG. 3, the set of sensors may be positioned at different places within the display at an edge of each display size.

For both FIGS. 2 and 3, all four "corners" of possible active areas may be used. Then it will be less obvious where the sensors are positioned from the user's perspective. This will give a better user experience that is less perceived disturbance for the user.

The sensors 113 shown in FIGS. 2 and 3 may be photo sensors. Each photo sensor is designed to look into the eye and are shielded from light coming from the outside, thus only activated by light that is reflected in the eye. Measurements are performed when the display elements or pixels are in off state to avoid crosstalk the measurement from the display.

Figure 4:
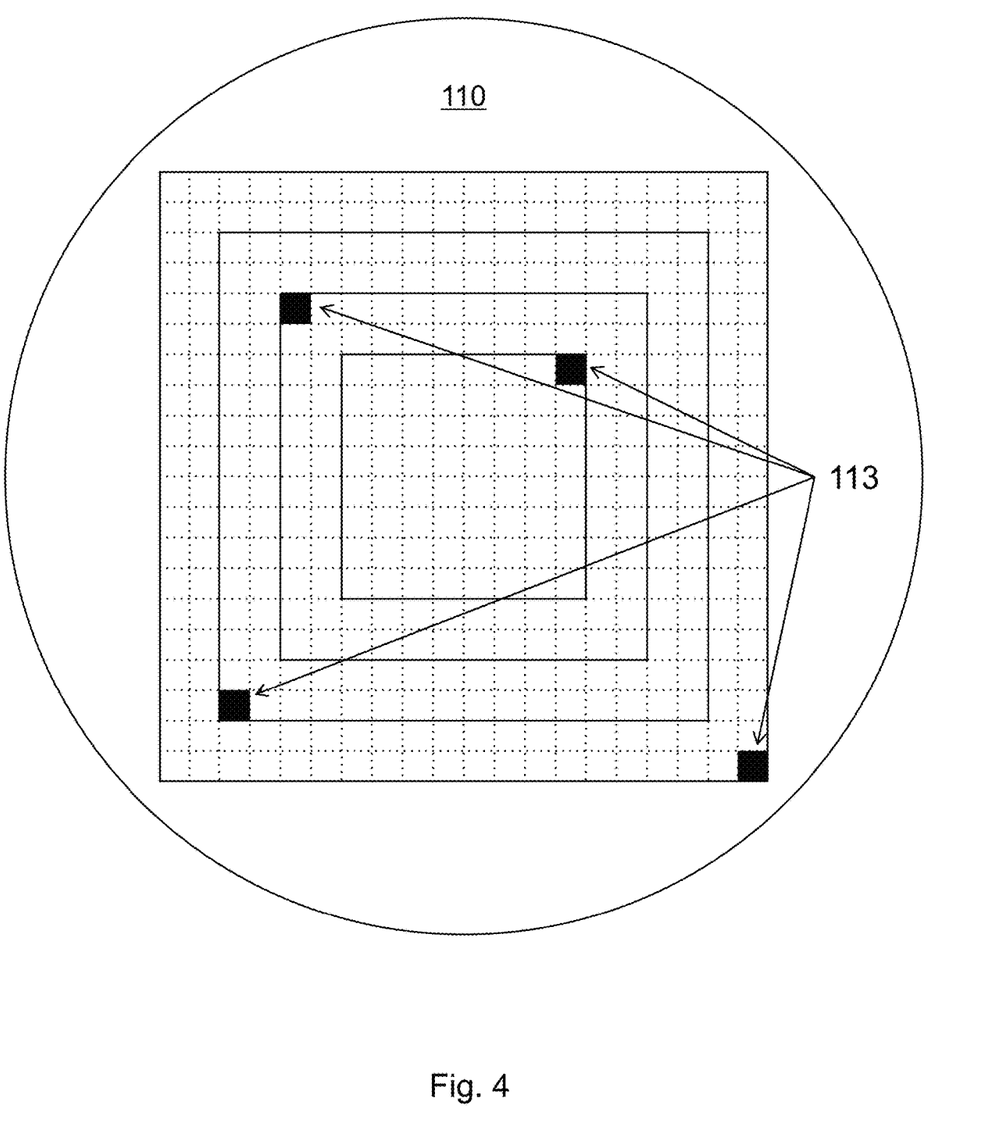
FIG. 4 is a schematic showing a contact lens system where sensors are positioned by each sensor replacing one or more display pixels.

The set of photo sensors may be positioned at intersections of the rows and columns of the display elements matrix, as shown in FIG. 4. That is, they may be positioned by each sensor replacing one or more display elements or pixels. Then the places occupied by the sensors will appear as dead pixels. When replacing one or more display elements or pixels, the photo sensors may be distributed in different arrangements, as long as they are in an intersection of a row and column, for example in the corners of each display size.

Figure 5:
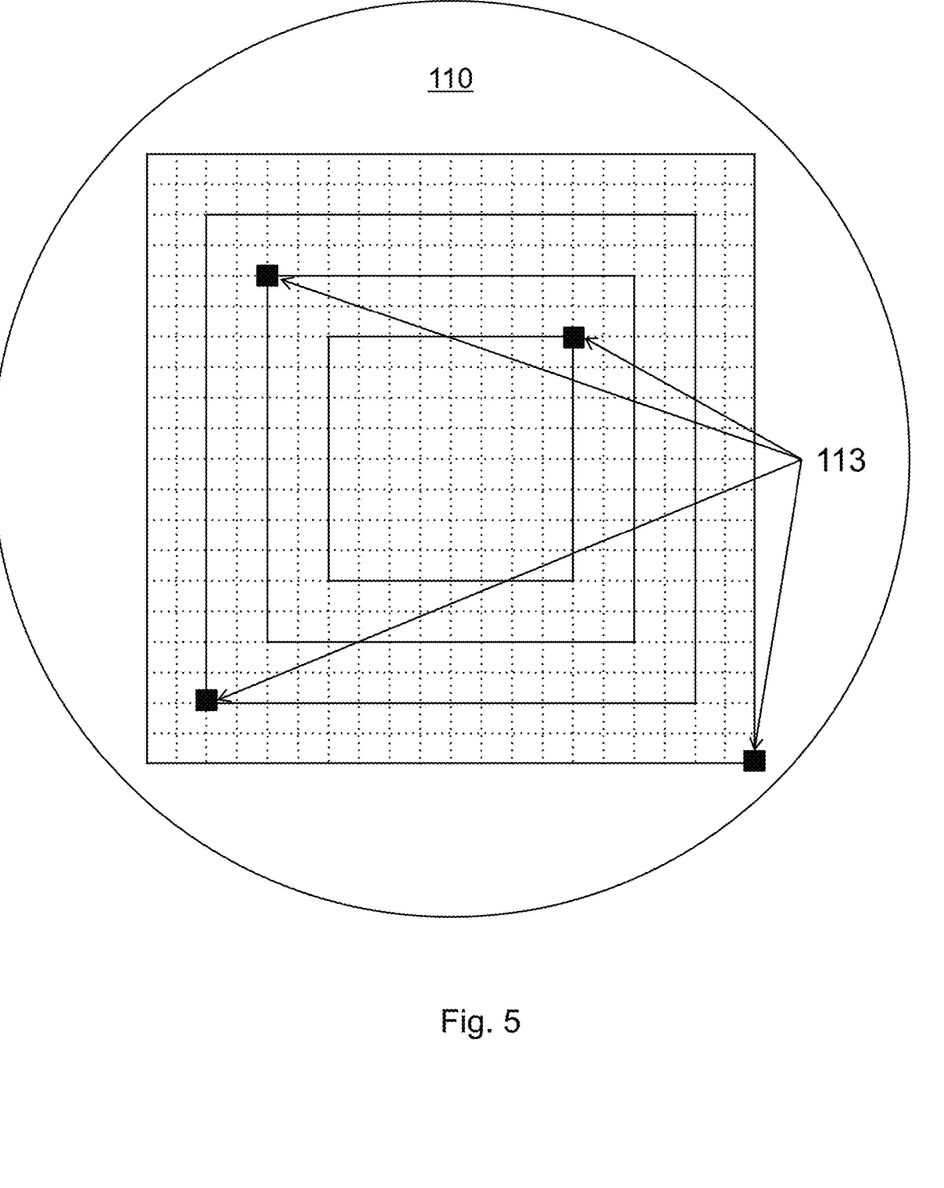
FIG. 5 is a schematic showing a contact lens system where sensors are positioned in between rows and columns of the display elements.

It is also conceivable to position the set of sensors in between rows and columns of the display elements, as shown in FIG. 5. Then the rows and columns of the display elements will stay intact and places occupied by the sensors will not appear as dead pixels, but the sensors still might be perceived as such if they are large enough.

According to the embodiments herein, the driver unit 112 is further configured to read outputs from the set of sensors 113 to determine the pupil size and adjust a size of an active area of the display 111 based on the pupil size by activating and deactivating the display elements.

According to some embodiments herein, the contact lens system 110 may further comprise one or more IR diodes placed close to a sensor to provide light towards the eye to reflect.

Figure 6:
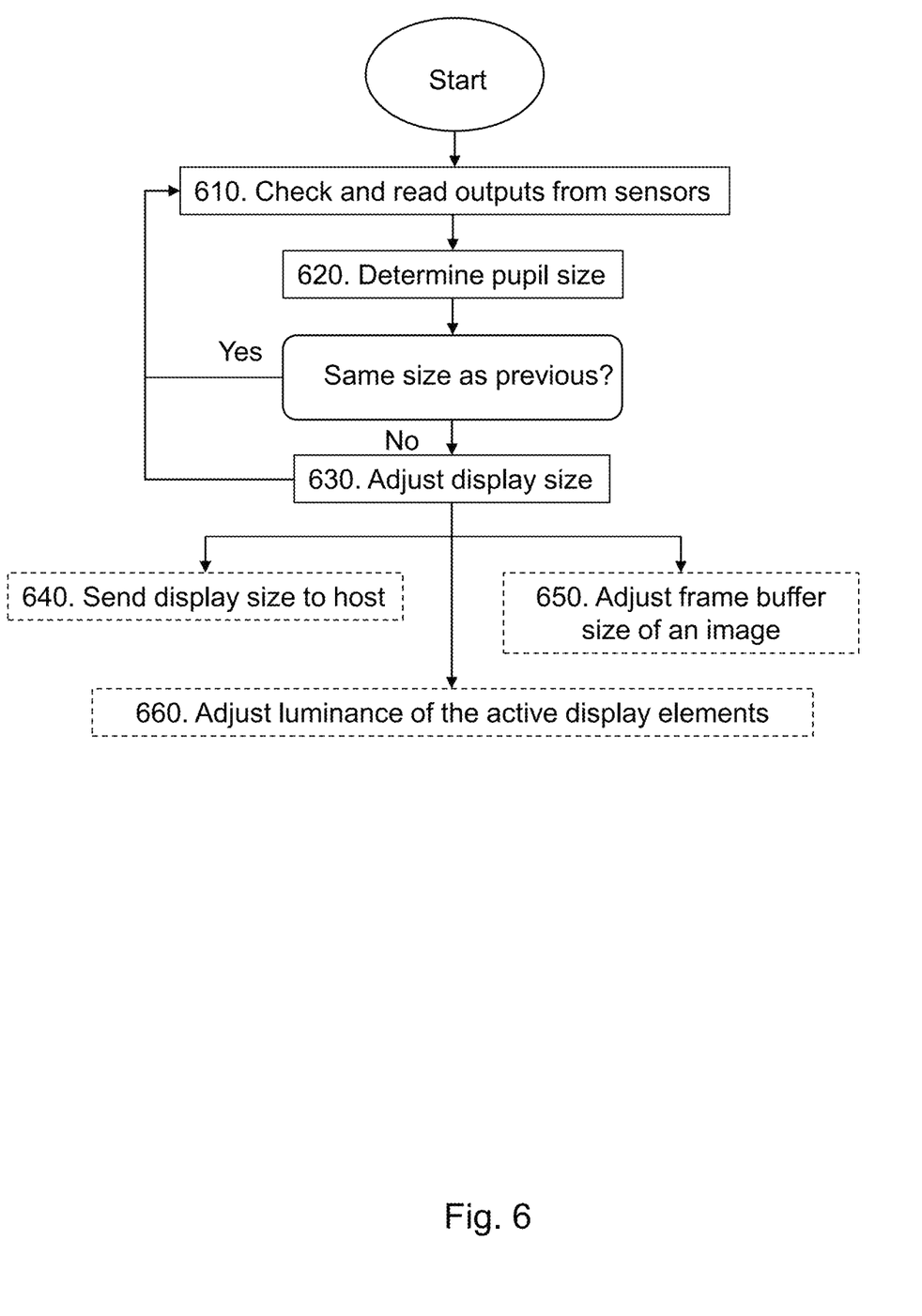
FIG. 6 is a flow chart illustrating a method performed in a contact lens system according to embodiments herein.

In the following a method performed in the contact lens system 110 for adjusting a size of an active area of the display 111 will be described in detail with reference to FIG. 6. As described above, the contact lens system 110 comprises a display 111 comprising a matrix of display elements, a driver unit 112 configured to receive data from a host 120 and to present the data on the display 111 and a set of sensors 113 integrated on the display 111 for measuring pupil size. The method comprises the following actions, which actions may be performed in any suitable order.

Action 610

Before each new frame to be presented on the display 111 or at regular intervals, e.g. every tenth frame, a few times per second or every second, the driver unit 112 checks the set of sensors 113 in order to detect the pupil size. Even if the processing and reading of the sensor signals only consume low power, a less frequent check will save some power. The driver unit 112 reads outputs from the set of sensors 113. The photo sensors are directed into the eye to be able to distinguish the edge between the pupil and the iris. Depending on the distance between the photo sensors and the number of photo sensors, the response curves when reading out the photo sensors will differ. See description of FIG. 9 below.

In some cases, the light from the display elements may be used as the light source for reflectance measurements, i.e. in dark environments. This is to get the best possible signal to noise ration (SNR) to be able to find a threshold for the reflected light for the set of sensors.

In one embodiment, the driver unit 112 may activate the relevant display elements to provide light towards the eye to reflect. For example, the display elements surrounding one photo sensor may be lighted up and the reflected rays from the display elements will be measured by the photo diode. Suitably the display elements outside the current pupil size should be activated to be able to find the edge. Further the display elements outside the current active area of the display may also be activated to provide light.

The driver unit 112 may activate the relevant display elements one at a time or all at once, i.e. the relevant display elements may be flashed quickly at once or may be activated one by one in a sweeping manner.

In one embodiment, one or more infrared (IR) diodes may be placed close to a sensor to provide light towards the eye to reflect. One or several additional IR diodes may be placed next to or close to any one or all of the photo sensors. The direction of the light should be towards the eye. By adding the IR diode there is no need for surrounding illumination to be able to detect the pupil size. The reflected IR rays from the IR diodes are measured instead. The benefit is that it results a more stable measurement as it is not dependent on enough light from the surroundings. The down part is if at least one more pixel area for the display is exchanged for an IR diode, this leaves less space for pixels on the display.

Action 620

The driver unit 112 determines the pupil size based on the outputs from the set of sensors.

Depending on the pupil diameter, sensors at various distances from the center of the iris will detect different amounts of reflected light. For example, when the iris is dilated most of the sensors may detect little light because of the large, dark pupil. Conversely, when the iris is constricted most sensors may detect higher light because of reflection of the iris.

Figure 7:
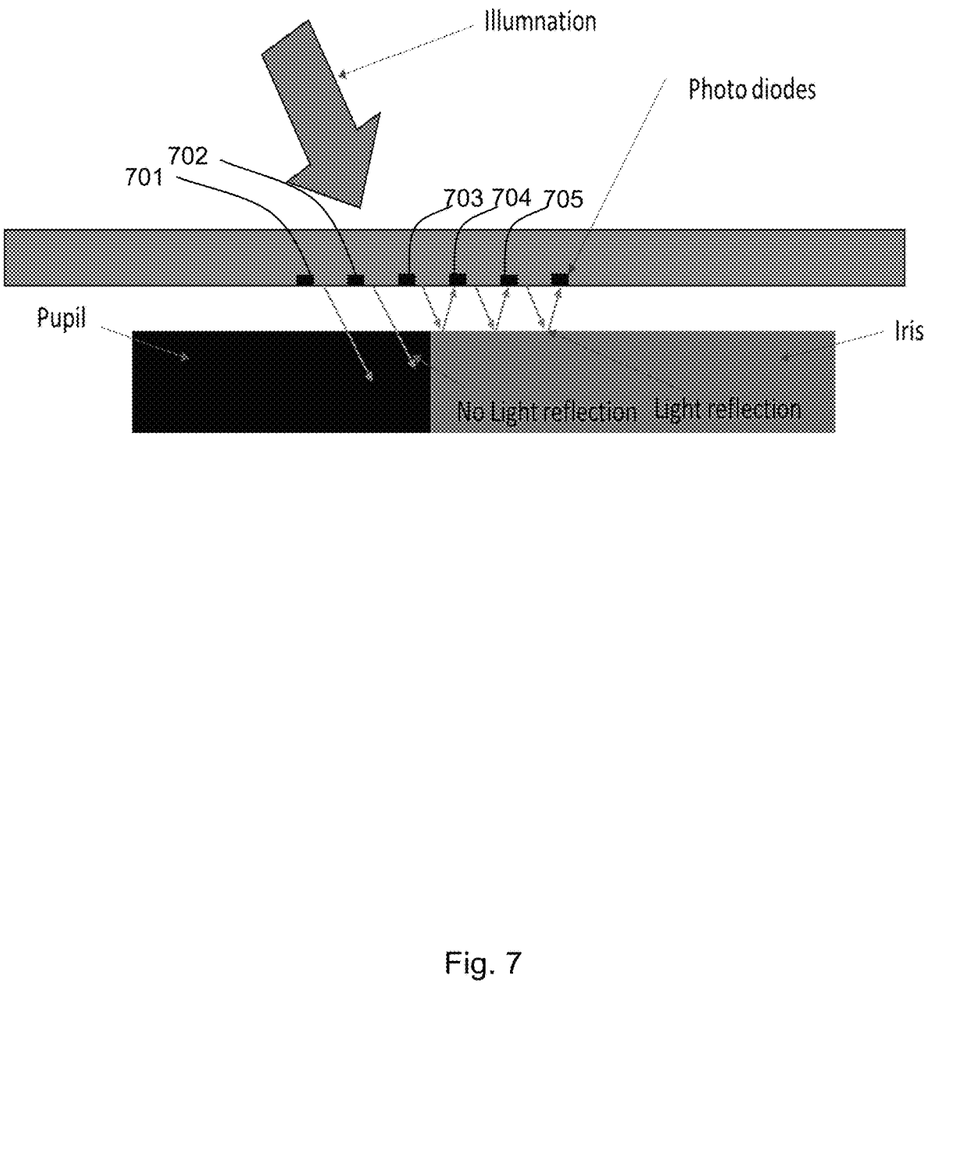
FIG. 7 is a schematic showing a simplified mechanism of how to use photo diodes to detect the pupil size.

FIG. 7 shows a simplified mechanism how to use photo diodes to detect the pupil size. The driver unit 112 may detect the edge between the pupil and iris by comparing the detected light from the set of sensors. In the pupil area, there is almost no light reflection, so photo diodes 701, 702 will not detect any reflected light and no output signal. Photo diodes 703, 704, 705 . . . will detect reflected light and have output signal. By comparing the detected light from the set of photo diodes 701, 702, 703, 704 . . . the edge between the pupil and iris may be found and the display size is selected based on this.

The driver unit 112 may determine the size of pupil by comparing the reflected light with a threshold. The granularity of the sensors is predefined or configured, i.e. the position, the distance between each sensor and how many sensors per area. The number of photo sensors that get reflected light enough to have an output signal over the threshold is counted and from that the pupil size is decided and the display size is selected based on this.

The difference in signal level from the photo sensors will be dependent on whether the light that is reflected by the iris or by the inner area surrounded by the iris, i.e. the pupil, with hardly any reflection. Differences may also arise with an iris of different color and resulting different reflectance at different areas of the iris and between different users.

So the light reflected will depend on the color of the iris and of course on the amount of light emitted from the environment and from the display. Therefore the threshold should be adjusted or calibration may be needed to take account these variations. The threshold for reflected light may be adjusted depending on the reflectance or brightness of the iris.

A calibration process may be implemented where the host 120 or the driver unit 112 may control the light output of the contact lens display 111. The gain of the photo sensors may also be controlled to find a suitable level of sensitivity. If no edge is detected between the pupil and iris, threshold can be lowered, while if multiple edges are detected, threshold can be increased.

There might be problems if the iris is dark brown and the light conditions of the environment and the display are low. Then the light reflected might be too little. Turning on display elements shortly before measuring or using IR diodes may solve this problem.

Figure 8:
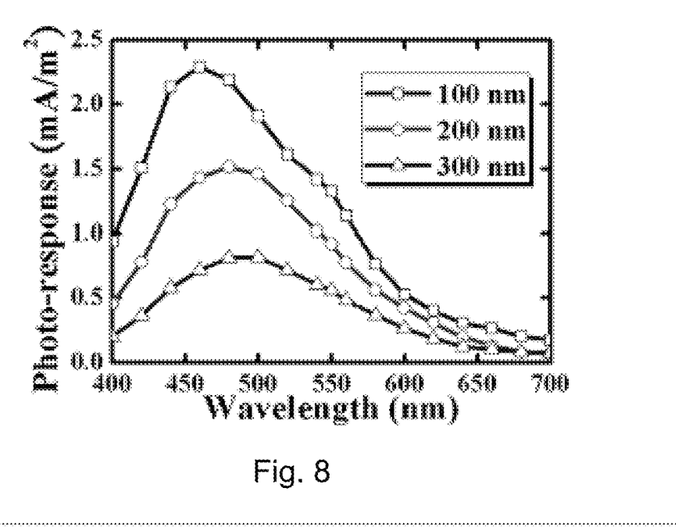
FIG. 8 is a diagram illustrating responses of photo sensor on an LTPS substrate.

Photo sensors on a Low-temperature polycrystalline silicon (LTPS) substrate may be used which have the wavelength sensitivity as shown in FIG. 8, according to the article of W. J. Chiang et.al., "*Silicon nanocrystal-based photosensor on low-temperature polycrystalline-silicon panels*", Applied Physics Letter, 91, 051120, 2007. FIG. 8 shows light absorption spectrum of samples with silicon nanocrystal layers of 100, 200, and 300 nm thickness monochromatically illuminated by a constant optical power of 35 W/cm$^2$ and a bias voltage of 2.5 V. Other substrates that can be used may be Amorphous Silicon (A-Si), Indium Gallium Zinc Oxide (IGZO) or similar technologies.

Action 630

The driver unit 112 determines if the pupil size is the same as from the previous measurement. If the pupil has not changed size, the driver unit 112 will check and read outputs from the set of sensors 113 again. If the pupil has changed size, the driver unit 112 will adjust the size of an active area of the display based on the pupil size by activating and deactivating the display elements.

Figure 9:
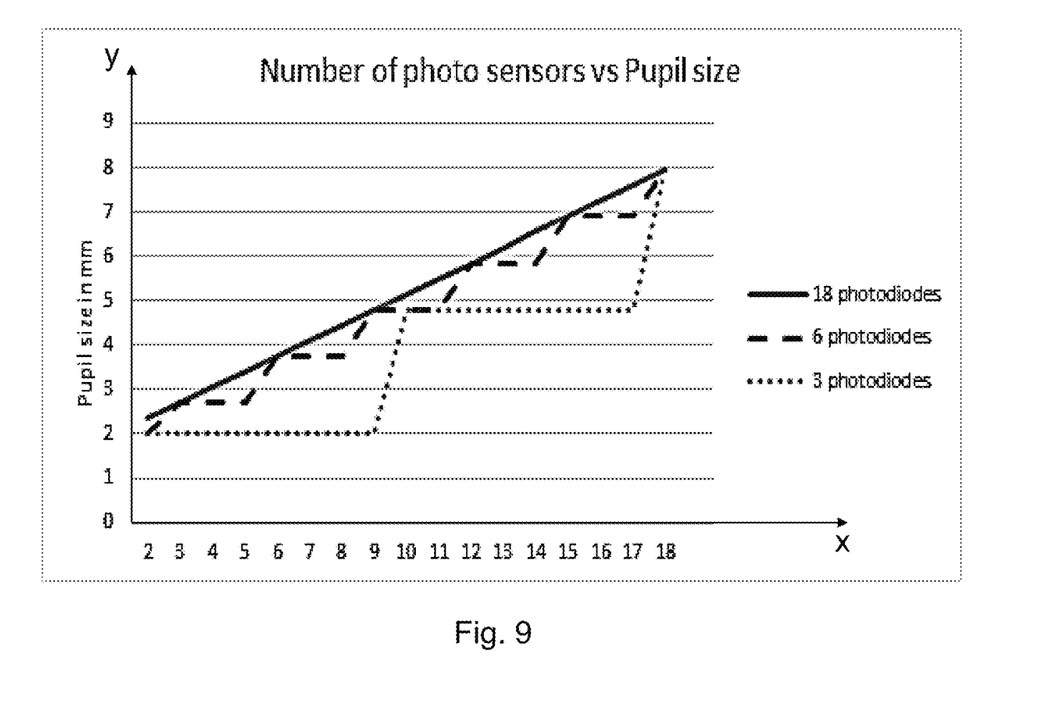
FIG. 9 is a diagram illustrating activation curves for a contact lens system with different numbers of sensors according to embodiments herein.

So once the pupil size is determined based on the threshold and the granularity of the photo sensors, the active area of the display may need to be decided and adjusted. That is appropriate number of rows and columns of the display elements may be activated based on the pupil size. Depending on the number of photo sensors placed in the display 111, the precision of the active area size will differ. FIG. 9 shows an example of activation curves where 3, 6 and 18 photo sensors are used, where the y axis is the pupil size ranging from 2 mm to 8 mm, and the x axis is the number of photo sensors included in the set of sensors within the active area that ranges from 2 mm to 8 mm, indicated as the amount of possible display sizes. It can be seen from FIG. 9, that less photo sensors will give a jagged activation curve, i.e. when using fewer photo sensors, the adjusting of the display active area will have larger discrete steps.

Action 640

Once the size of the active area is decided based on the threshold and the granularity of the photo sensors, the new active area size needs to be communicated. So according to some embodiments herein, the driver unit 112 may send the size of the active area of the display to the host 120.

There are at least two different ways to handle the different active area sizes of the display.

According to some embodiments herein, the driver unit 112 either transmits the new display size to the host 120 or the host 120 asks if there is a new size and retrieves the new size from registers in the driver unit 112. The host 120 then adjusts its internal display buffers and settings so that a correct size of image is sent to the driver unit 112 in the contact lens 110. If the host can adjust the image size, power will be saved in the whole system 100 as the image reduction is done already on the host.

Action 650

According to some embodiments herein, the driver unit 112 may always receive the same size of image and depending on the active area size that is decided based on the photo sensors, the driver unit 112 will reduce the size of the image accordingly. This is a more flexible solution which will give the host 120 more freedom. The amount of data handled in the host 120 and that is transferred to the driver unit 112 is the same (maximum) size independent on the active area size of the display, thus consuming more power.

So according to some embodiments herein, the driver unit 112 may be configured to adjust frame buffer size of an image received from a host based on the size of active area of the display.

Action 660

The pupil size will be affected by changes in the amount of light entering the eye. In order not to change the pupil size when the luminance is changed on the lens display due to the change of the display size or other reasons, there is a control that keeps the same amount of lumen output from the display. So when the active area of the display gets larger the luminance of the display will drop so that the same amount of lumen will hit the retina. The opposite will happen when active display area gets smaller, the luminance of the display will increase to keep a consistent lumen.

So the total luminance out of all active display elements should be kept at or not exceeding a defined value, e.g. a maximum lumen, max_lumen, as expressed in Eq.1:

$$\Sigma \text{lumen}_{pixel} = \text{max\_lumen} \qquad \text{Eq. 1}$$

That is the maximum lumen out of the display should always be the same independent on how many active display elements. For AR applications, the size of the virtual objects is important to consider. Displaying large virtual objects might produce lots of lumens, while displaying short texts and bounding boxes might require less. Therefore the maximum lumen output should depend on that too. The defined lumen value may be a preferred value or automatic adjusted according to likings of individual users. This is done to have a more comfortable usage and the user should experience the same light intensity to the retina.

Therefore according to some embodiments herein, the driver unit 112 may be configured to adjust luminance of the active display elements to keep the total amount of lumen output from the display at a defined value. The driver unit 112 may be further configured to adjust the defined value according to preferred settings of individual users.

To summarize, the contact lens system 110 and method therein according to the embodiments herein provide an improved visual system for augmented reality systems with at least the following advantages:

Eye-mounted displays bring significant advantages in comparison to non-eye-mounted displays.

From the usability perspective, contact lenses could be promising as wearable displays, since they are naturally discrete, and the form factor is widely accepted. Moreover, the amount of energy required to drive the displays would be significantly less than displays that are farther away.

By measuring the pupil size, the display can dynamically be changed in size so that maximum amount of pixels can be used to display content.

The user will always be able to see the maximum size of the display and that the data needed is dynamically adjusted based on the active display size.

Integrating the display and the sensors in a unique way by manufacturing the sensors in the same process steps as the display elements simplifies the manufacture.

The system always provides a display with maximum field of view, regardless of changes to the pupil size, and without wasting power on pixels that are outside the field of view. The system saves power by reducing the display size and turn off pixels in the periphery, which would not be able to be seen anyway since they would be out of the field of view of the eye. When the pupil size increase, then the display size can get larger again to fill the field of view.

The system increases the user experience by maintaining perceived brightness of the display constant or at a preferred/comfortable level by adjusting the display luminance based on the display size. This can also be seen as an optimization on power usage.

There is no need for additional hardware to adjust the size of the active area of the display. The contact lens system itself includes all needed hardware to accomplish this.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A contact lens comprising:
    a display comprising display elements; and
    a driver configured to present information on the display and to adjust a size of an active area of the display based on a pupil size.

2. The contact lens of claim 1, wherein the driver is configured to keep a total luminance level of the display at or below a defined value.

3. The contact lens of claim 2, wherein
    the driver is configured to adjust the size of the active area of the display from a first size to a second size,
    the second size is larger than the first size, and
    the driver is configured to decrease a luminance level of each of one or more of the display elements in response to adjusting the size of the active area of the display from the first size to the second size.

4. The contact lens of claim 2, wherein
    the driver is configured to adjust the size of the active area of the display from a first size to a second size,
    the second size is smaller than the first size, and
    the driver is configured to increase a luminance level of each of one or more of the display elements in response to adjusting the size of the active area of the display from the first size to the second size.

5. The contact lens of claim 1, wherein the driver is configured to adjust a size of a display content to be displayed on the display based on the adjusted size of the active area of the display.

6. The contact lens of claim 1, wherein the driver is configured to:
    transmit towards an external device size information indicating the adjusted size of the active area of the display, and
    after transmitting the size information, receive from the external device a display content which is adjusted by the external device in accordance with the adjusted size of the active area of the display.

7. The contact lens of claim 1, wherein the size of the active area of the display corresponds to a size of a portion of the display that can be perceived by an eye when the contact lens is worn on the eye.

8. The contact lens of claim 1, comprising one or more sensors configured to measure the pupil size.

9. The contact lens of claim 8, wherein said one or more sensors are photodiodes configured to detect light reflected from an eye when the contact lens is worn on the eye.

10. The contact lens of claim 9, wherein the light reflected from the eye was transmitted by (i) one or more of the display elements or (ii) one or more of infrared (IR) diodes comprised in the contact lens.

11. A method performed by a contact lens, the method comprising:
    presenting information on a display included in the contact lens; and
    adjusting a size of an active area of the display based on a pupil size.

12. The method of claim 11, comprising:
    keeping a total luminance level of the display at or below a defined value.

13. The method of claim 12, comprising:
    adjusting the size of the active area of the display from a first size to a second size, wherein the second size is larger than the first size; and
    decreasing a luminance level of each of one or more of display elements included in the display in response to adjusting the size of the active area of the display from the first size to the second size.

14. The method of claim 12, comprising:
    adjusting the size of the active area of the display from a first size to a second size, wherein the second size is smaller than the first size; and
    increasing a luminance level of each of one or more of display elements included in the display in response to adjusting the size of the active area of the display from the first size to the second size.

15. The method of claim 11, comprising:
    adjusting a size of a display content to be displayed on the display based on the adjusted size of the active area of the display.

16. The method of claim 11, comprising:
    transmitting towards an external device size information indicating the adjusted size of the active area of the display, and
    after transmitting the size information, receiving from the external device a display content which is adjusted by the external device in accordance with the adjusted size of the active area of the display.

17. The method of claim 11, wherein the size of the active area of the display corresponds to a size of a portion of the display that can be perceived by an eye when the contact lens is worn on the eye.

18. The method of claim 11, comprising:
    measuring the pupil size using one or more sensors included in the contact lens.

19. The method of claim 18, comprising:
    detecting light reflected from an eye when the contact lens is worn on the eye using said one or more sensors, wherein
    said one or more sensors are photodiodes.

20. The method of claim 19, wherein the light reflected from the eye was transmitted by (i) one or more of the display elements or (ii) one or more of infrared (IR) diodes comprised in the contact lens.

* * * * *

UNITED STATES PATENT AND TRADEMARK OFFICE
CERTIFICATE OF CORRECTION

PATENT NO. : 12,085,720 B2
APPLICATION NO. : 18/217263
DATED : September 10, 2024
INVENTOR(S) : Hunt et al.

It is certified that error appears in the above-identified patent and that said Letters Patent is hereby corrected as shown below:

In the Claims

In Column 10, Lines 31-32, in Claim 20, delete "the display elements" and insert -- display elements --, therefor.

Signed and Sealed this
Eleventh Day of February, 2025

Coke Morgan Stewart
*Acting Director of the United States Patent and Trademark Office*